United States Patent [19]

Guala

[11] 3,894,661
[45] July 15, 1975

[54] LIQUID MEASURING AND DISPENSING BOTTLE CLOSURE DEVICE

[75] Inventor: Piergiacomo Guala, Alessandria, Italy

[73] Assignee: Angelo Guala S.p.A., Alessandria, Italy

[22] Filed: Mar. 22, 1974

[21] Appl. No.: 453,906

[30] Foreign Application Priority Data
Mar. 27, 1973 Italy.................................. 67874/73

[52] U.S. Cl................................. 222/188; 222/454
[51] Int. Cl.............................................. B67d 3/18
[58] Field of Search ........... 222/188, 425, 437, 438, 222/442, 444, 454, 455, 457, 481.5, 482, 483, 488, 547, 567, 569, 479, 456, 420–422; 141/46

[56] References Cited
UNITED STATES PATENTS

| 635,963 | 10/1899 | Hoage et al.......................... | 222/425 |
| 2,868,244 | 1/1959 | Kirschenbaum..................... | 222/479 |
| 3,319,842 | 5/1967 | Miller.................................. | 222/547 |
| 3,707,247 | 12/1972 | Guala.................................. | 222/454 |

FOREIGN PATENTS OR APPLICATIONS
484,955   5/1938   United Kingdom................. 222/454

Primary Examiner—Robert B. Reeves
Assistant Examiner—H. Grant Skaggs, Jr.
Attorney, Agent, or Firm—Sughrue, Rothwell, Mion, Zinn & Macpeak

[57] ABSTRACT

A metering pourer for attachment to the neck of a bottle and formed as a cylindrical hollow body with a metering control chamber located concentrically therein and a central air inlet tube which projects into the metering control chamber and communicates, when the pourer is attached to a bottle, with the interior of the bottle, in which there is provided a transverse diaphragm having a plurality of openings through which the liquid must flow to pass from the bottle, the openings being sufficiently small to be spanned by a film of the liquid due to surface tension, once wetted thereby, so as to prevent the inflow of air to the bottle by the liquid exit route, thus controlling the air to flow into the bottle only via the air inlet tube.

11 Claims, 9 Drawing Figures

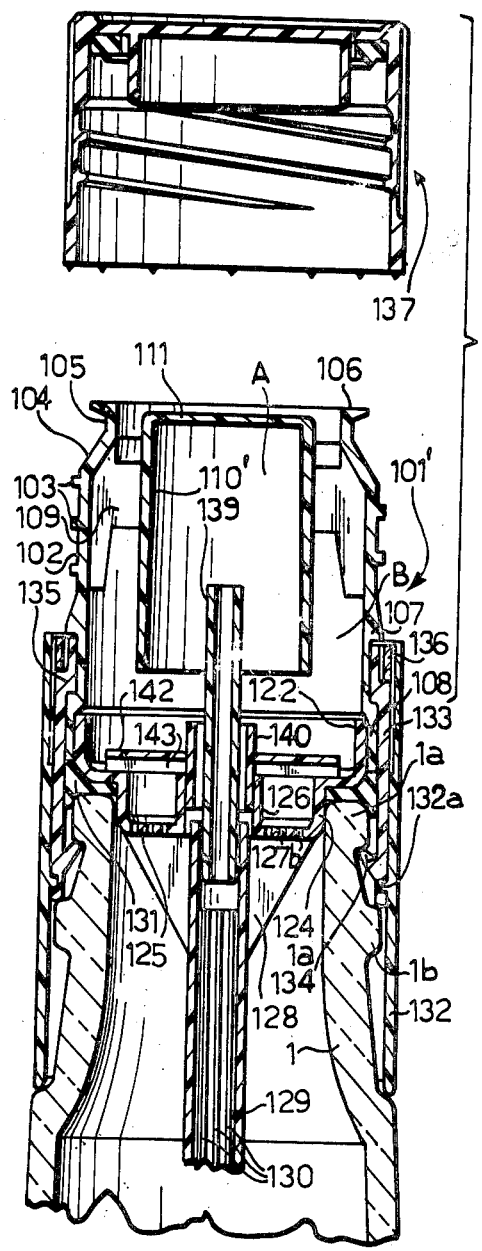
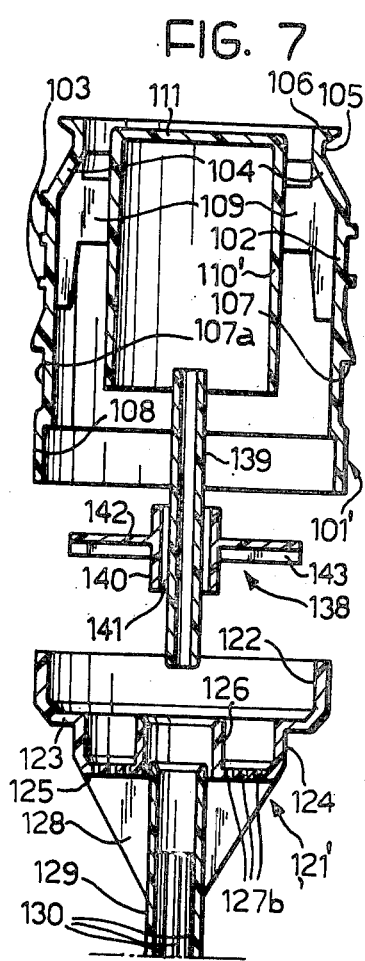
FIG. 6
FIG. 7

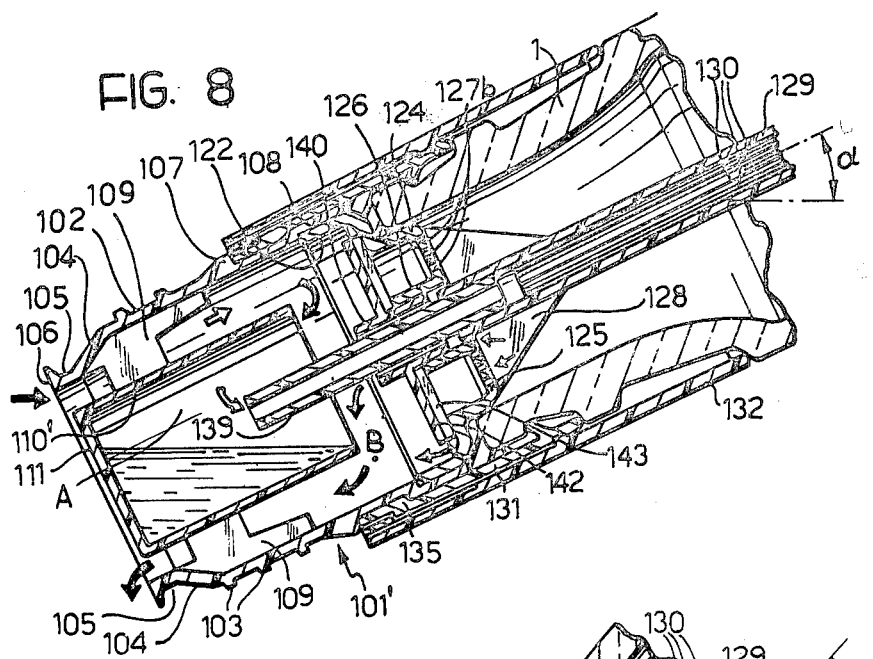
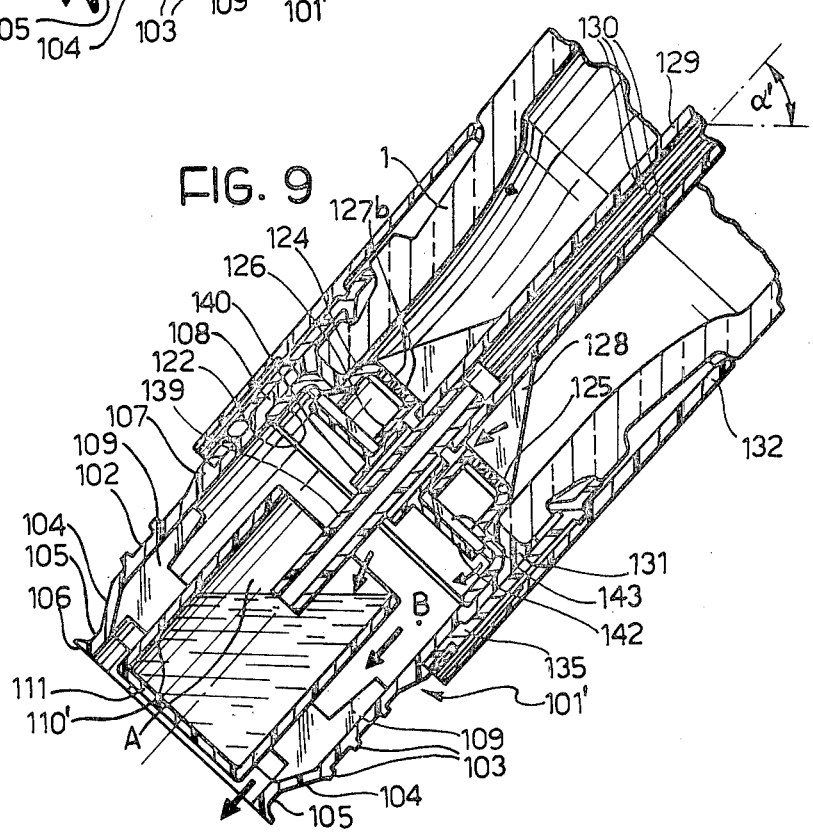

LIQUID MEASURING AND DISPENSING BOTTLE CLOSURE DEVICE

The present invention relates to a pourer for bottles, and particularly to a pourer for bottles, of the type which comprises a substantially cylindrical hollow body which is sealed on to the mouth of a bottle, a metering control chamber located coaxially within the hollow body and forming with the latter an annular pouring passage communicating with the outside by means of an annular outlet mouth; a small air inlet tube extends from the metering control chamger to the interior of the bottle and forms the inner wall of an annular opening which allows the entry of liquid from the bottle into the metering control chamber, and in the annular space between the body and the air inlet tube there are means for preventing the inflow of air to the inside of the bottle through the annular pouring passage.

When the bottle is tilted a part of the liquid flows down to the annular pouring passage, and out through the annular mouth whilst a part of it flows into the metering control chamber, gradually filling it. At the same time air flows into the interior of the bottle passing up through the pouring passage and through the metering chamber where it enters the small central air inlet tube by means of which it passes into the interior of the bottle. When the level of the liquid in the metering control chamber reaches the mouth of the inlet tube no further air can pass into the bottle, and pouring of the liquid ceases as an air lock forms in the bottle.

One of the problems associated with pourers of this type is that of ensuring that the quantities poured out are constant regardless of the amount of liquid which remains in the bottle, and regardless of the angle to which the bottle is tilted during pouring. It is particularly important to avoid the entry of air through the outlet route of the liquid which may occur upon slight tilting of the bottle after locking has taken place, which would allow further liquid to flow out of the bottle.

In embodiments of the present invention, which are formed as metering pourers of the type described, entry of air into the bottle, through the outlet route of the liquid, is substantially prevented after the locking brought about by filling of the chamber, regardless of the tilt of the bottle and of the quantity of liquid remaining in it, and a regular influx of air during pouring is ensured without it being possible for this flow to be altered by the formation of lenticular films of liquid on the inside of the air inlet tube.

According to the present invention there is provided a metering pourer of the type comprising a substantially cylindrical hollow body, a metering control chamber housed coaxially within the body and forming therewith an annular pouring passage for the liquid, an air inlet tube one end of which extends into the metering control chamber and the other end of which communicates, when the pourer is positioned on the neck of a bottle, with the interior of the bottle, the air inlet tube forming the inner wall of an annular opening which permits the entry of liquid from the bottle into the metering control chamber when the bottle is tilted for pouring, in which the flow of air through the inlet tube is prevented when the liquid in the metering control chamber reaches a predetermined level, characterised in that the said annular pouring passage is separated from the interior of the bottle by a transverse diaphragm provided with a plurality of openings the dimensions of which are such that when they have been wetted by liquid a film of the liquid forms across each as a result of surface tension, thus preventing air from traversing the diaphragm.

Preferably a metering pourer is characterised in that at least a part of the air inlet tube is provided with internal longitudinal radially inwardly projecting ribs for inhibiting the formation of transverse films of liquid which would impede the regular inflow of air along the air inlet tube during pouring.

Various embodiments of the invention will now be more particularly described, by way of example, with reference to the accompanying drawings, in which:

FIG. 6 is an axial section of a third embodiment of a metering pourer, shown in position on an upright bottle;

FIG. 7 is an exploded axial section of the embodiment of FIG. 6; and

FIGS. 8 and 9 are two axial sections of the embodiment of FIGS. 6 and 7 illustrating it in position on a bottle and tilted at two different angles.

Figure 1:
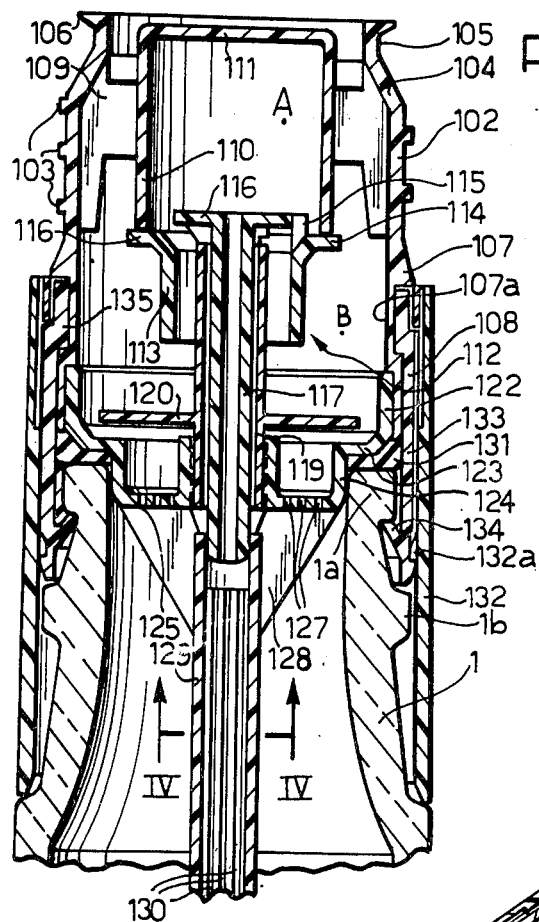
FIG. 1 is an axial section of a metering pourer for bottles, formed as a first embodiment of the invention, and shown in position on an upright bottle.

In order to facilitate the description of the embodiments reference will be made herein to the embodiments in the orientation which they would adopt when in position on an upright bottle. References to "upper" and "lower" parts will thus be construed as if the pourer were in this orientation.

Referring now to the drawings there is shown the neck 1 of a bottle which has at the top two annular ridges 1a, 1b, spaced from each other so as to form an acute-angled groove between them. On the neck 1 of the bottle there is a metering pourer formed according to the invention and comprising a number of separately moulded elements of plastics material which are designed to be fitted together easily. The first embodiment of the invention, illustrated in FIGS. 1 to 4, is generally indicated 101 and comprises a cylindrical body 102, which is provided with outer helical threads 103 for receiving a screw cap (not shown). At the top of the cylindrical body 102 there is a conically tapered portion 104, connected to a short cylindrical portion 105 of smaller diameter which ends in an outwardly flared lip 106. The cylindrical body 102 also has an annular ridge 107, which is asymmetrical in cross section, located midway along its length, and a portion 108 of larger diameter at the lower end thereof and forming, with the projection 107, a shallow annular groove 107a.

To the cylindrical body 102 there is connected, by means of radial fins 109, a coaxial inner cylindrical body 110 which is closed at the upper end by a transverse wall 111 which defines, with the wall of the body 110 a metering control chamber A.

A second element 112, comprises a tubular portion 113 having a flat radial flange 114 to which is attached, by means of fins 115, a disc 116 integral with a small tube 117 which is coaxial with respect to the outer tubular portion 113 and which projects downwardly through the tubular portion 113. Upon assembly of the pourer the flange 114 of the element 112 closes the base of the cylindrical body 110 of the metering control chamber A so as to connect this to the tubular portion 113 and to the interior of the small tube 117 to allow air to penetrate into the inside of the bottle during pouring as will be described below. The interior of the chamber A also communicates with an annular passage B between the wall of the body 102 and the wall 110 of the chamber A, via the annular passage between the cylindrical wall 113 and a sleeve 119 which surrounds, but is spaced from, the tube 117 which carries at the top a number of raidal ribs 118 which locate the small tube 117 coaxially within the sleeve 119. The sleeve 119 also carries a transverse flange 120. The annular passage between the tube 117 and the sleeve 119 forms a route for the liquid which is to fill the metering control chamber A during pouring: by varying the outer diameter of the tube 117 it is possible to vary the cross section of this passage and thus to vary the time taken to fill the chamber A. This determines the quantity of liquid poured out at any one time.

At the base of the cylindrical body 102 there is an element 121, which comprises a short tubular wall 122 of such a diameter as to be a tight fit in the lower portion 108 of the first body 101, a transverse wall 123 in the form of an annular crown, a second tubular wall 124 of smaller diameter, and a transverse diaphragm 125 having a central tubular boss 126 into which the sleeve 119 engages. The transverse diaphragm 125 is provided with openings 127a through which the liquid passes on pouring. The dimensions of these openings are such that, when they have been wetted by the liquid, a film of the liquid forms across each as a result of surface tension, thus preventing entry of air into the bottle through the diaphragm 125.

Figure 4:
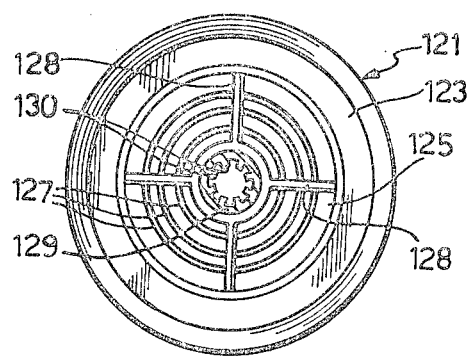
FIG. 4 is a cross section of the embodiment of FIG. 1, taken on the line IV—IV of FIG. 1.
Figure 5:
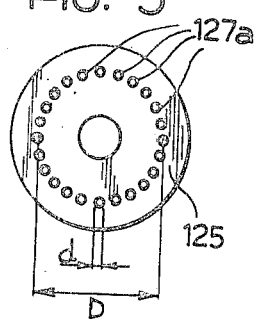
FIG. 5 is a diagrammatic plan view of a transverse diaphragm forming part of a second embodiment of the invention.

In the embodiment shown in FIG. 4, the openings in the diaphragm 125 are formed as three concentric series of arcuate slots 127. There are four slots 127 in each series forming, effectively, an annular opening, adjacent slots being separated by radial ribs 128. It has been found that, with slots 127 of this form, if the metering pourer is to be used on bottles containing liquors with an alcohol proof strength of between 11° and 45° and a sugar content of between 17% and 30%, best results are obtained by making the radial width of the slots 127 between 0.45 and 0.55 mm. The openings in the diaphragm 125 may, however, be of a different form from that described above. For example, these openings may be circular holes arranged in one or more circles concentric with the axis of the metering pourer. For use on a bottle containing a liquor with alcohol proof strength of 30° and a sugar content of 27%, good results have been obtained by using a diaphragm 125 having a single ring of holes 127a, such as that shown in FIG. 5, the holes having a diameter $d$ of 0.5 mm, and the centres being situated in a circle having a diameter $D$ of 16 mm.

This minimises the danger of air entering the bottle by traversing the diaphragm 125 after a metered quantity has been poured out and before the bottle is returned to an upright position, even should the bottle be slightly tilted so as to leave some of these openings uncovered.

Integral with the element 121 there are inclined radial fins 128 which connect the bottom diaphragm 125 to a further narrow tube 129, which extends inside a bottle to which the pourer is attached. Upon assembly of the pourer the tube 129 engages over the small inner tube 117 which extends from the base of the metering control chamber A. On the inner surface of the tube 129 there are longitudinally extending ribs 130 which project radially inwardly towards the axis of the tube so as to inhibit the formation, due to surface tension of the liquid, of lenticular films which could prevent the regular inflow of air. The tube 129 engages the end of the inner tube 117 at a position spaced from the flanged sleeve 119 in order to allow entry of the liquid into the annular space between the tube 117 and the sleeve 119, when a bottle to which the pourer is attached is tilted for pouring out the liquid.

Figure 2:
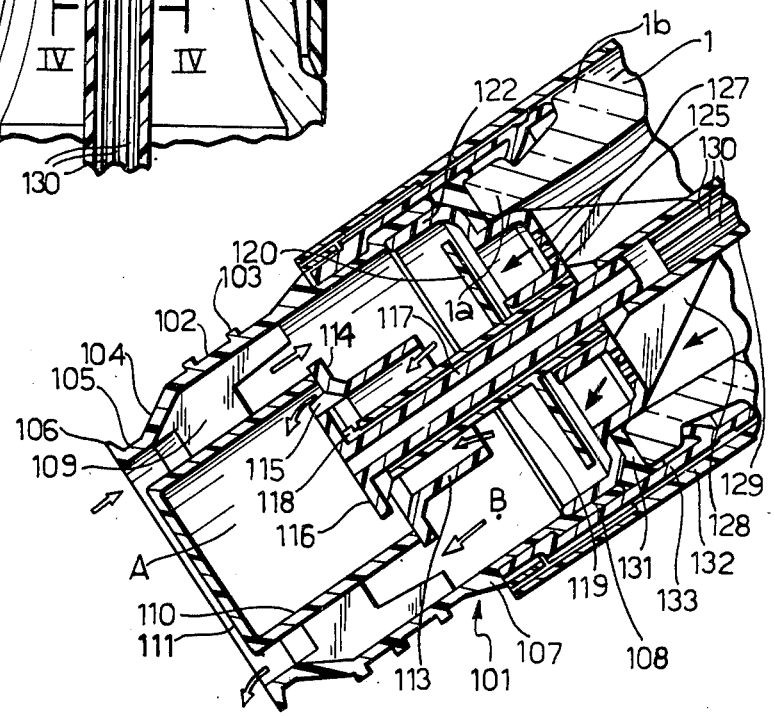
FIG. 2 is a view similar to FIG. 1 illustrating the pourer and the bottle in the tilted, pouring position.
Figure 3:
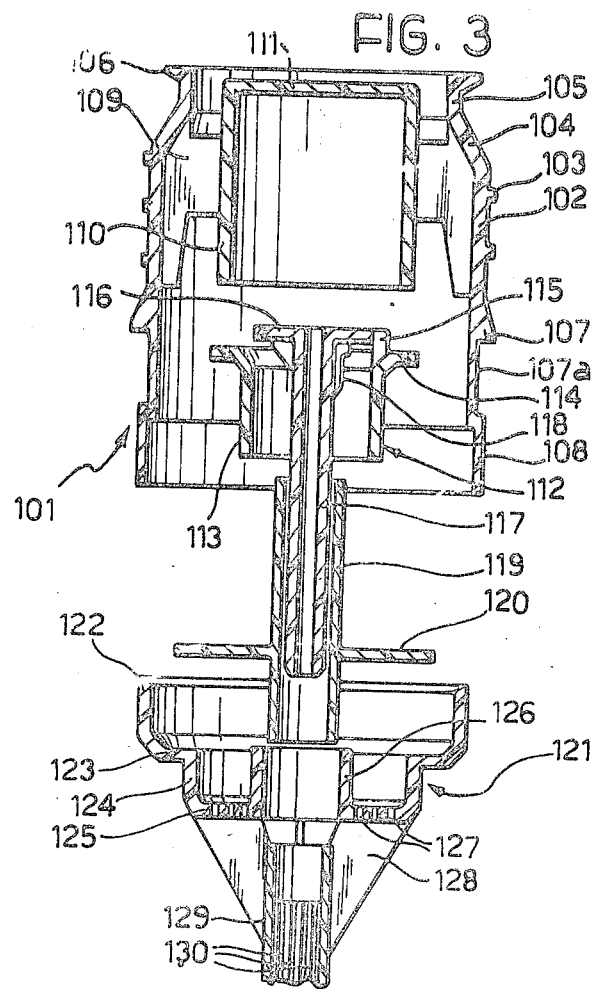
FIG. 3 is an exploded axial section of the embodiment of FIG. 1.

In the embodiment illustrated in FIGS. 1 and 2 the body of the pourer is sealed to the neck of the bottle by a sealing ring 131, arranged between the outer orifice of the neck 1 of the bottle and the base element 121. Anchoring of the pourer to the bottle is effected by means of a first, outer, sleeve 132, which partly surrounds the neck of the bottle and partly surrounds the hollow body 101, and a second, inner, sleeve 133, which is provided at the base with resilient teeth 134 which snap engage, upon assembly, into the groove formed between the two annular ridges on the neck 1 of the bottle, and at the top with an inwardly extending step 135 which engages into the groove 107a of the cylindrical wall 102 of the hollow body 101 so as to lock this to the neck 1 of the bottle. The outer sleeve 132 is provided with inner projections 132a which lock it axially to the inner sleeve 133.

When the bottle is tilted to the position shown in FIG. 2 for pouring out the liquid contained therein, the liquid passes through the openings 127 or 127a in the diaphragm 125 into the annular passage 8, from there flowing out through the annular mouth defined between the body 102 and the cylindrical walls of the chamber A. At the same time a part of the liquid enters the annular passage between the inner tube 117 and the intermediate sleeve 119 and flows down this into the metering control chamber A.

Simultaneously, air flows into the bottle through the pouring chamber, in counter current with respect to the liquid flow, and then passes through the chamber A into the inner tube 117, along this into the tube 129 and then into the bottle. When the level of liquid in the metering control chamber A reaches the mouth of the inner tube 117, pouring out of the liquid ceases as an air lock forms in the bottle.

The quantity of liquid poured out therefore depends basically upon the time necessary for filling the metering control chamber A. The size of the passage between the inner tube 117 and the intermediate sleeve 119 determines how quickly this is achieved and thus determines the quantity metered by the pourer. Also, the inlet to the metering control chamber A is screened from the main flow of liquid out through the annular passage B by the tubular shield 113.

This also ensures that the quantity poured out is rendered constant regardless of the angle to which the bottle is tilted during pouring, and also regardless of the amount of liquid remaining in the bottle. A metering pourer of the type described in relation to FIGS. 1 to 3, when attached to the neck of a bottle, therefore allows only predetermined quantities of the liquid contained in the bottle to be poured out at any one time. In some circumstances, however, it is desirable to be able to pour from the bottle a larger or smaller amount than the predetermined quantity, at the discretion of the operator. This could occur, for example, if the pourer were attached to a bottle of liquor which is sometimes to be poured out in predetermined measures and sometimes to be poured out in smaller or larger measures for mixing with other liquids. The embodiment of FIGS. 6 to 9 enables such a choice to be exercised.

Referring now to FIGS. 6 to 9 there is shown a metering pourer comprising a hollow body 101' moulded from plastics material and having a tubular element 110', closed at the top by a transverse wall 111 to form a metering control chamber A, suspended within the hollow body 101' by means of radial fins 109. The metering control chamber A delimited by the tubular element 110' and by the transverse wall 111, has a wide mouth at the base thereof and no guard.

A second moulded plastics element 121' is located at the base of the hollow body 101' and rests upon the neck of the bottle 1 with the interposition of a sealing ring 131: this element, as shown in FIG. 7, comprises an outer annular wall 122, a transverse wall 123 in the form of a radial annular web, a second, radially inner, annular axial wall 124, a second transverse wall 125 provided with openings 127b for the passage of liquid, and a tubular inner boss 126 extending upwardly from the second transverse wall 125. Radial fins 128 extending from the lower face of the transverse wall 125 carry a small tube 129 having inner radial ribs 130: the end of the tube 129 is spaced from the tubular boss 126, to leave a passage for the liquid.

A third element 138 of the pourer, also moulded from plastics material is interposed between the other two; this consists of a small inner air inlet tube 139 for drawing in air, a short outer collar 140 surrounding the inner tube 139 and connected to it by means of radial ribs 141, and a transverse disc-shaped flange 142, projecting from the outer collar 140 and having radially extending ridges 143 on one face.

When the pourer is assembled the third element 138 is so arranged that the short outer collar 140 is fitted tightly into the inner tubular boss 126 of the lower element 121'; the lower portion of the air inlet tube 139 thus fits into the upper portion of the tube 129 carried by the fins 128 and which extends into the inside of a bottle to which the pourer is attached. The upper extremity of the air inlet tube 139 extends some distance into the interior of the metering control chamber A. The upper end of the outer collar 140, however, remains spaced from the lower end of the said chamber so that the metering pourer is able to operate in two different modes depending on the tilt of the bottle.

As shown in FIG. 8, if the bottle is tilted such that the angle it makes with the horizontal ($\alpha$ in FIG. 8) is less than 25°, the metering control chamber will never fill to the point at which the liquid it contains closes the mouth of the air inlet tube 139 due to the fact that the inlet tube 139 extends only a short distance into the chamber A. Even filling of the metering control chamber to the extent shown in FIG. 8 is delayed since the liquid which flows between the outer collar 140 and the inlet tube 139 does not all flow directly into the chamber A but tends to flow into the stream of liquid which has passed through the openings 127b, and then proceeds to the annular pouring opening. Therefore liquid can be poured continuously, if rather slowly, as though there were no metering device in the pourer.

When the bottle is tilted to an angle greater than 25°, as shown by $\alpha'$ in FIG. 9, liquid flowing in the annular passage between the collar 40 and the air inlet tube 139 will fill the metering control chamber A in a given time so that the level of liquid within it obstructs the mouth of the air inlet tube 139, thereby preventing further pouring of the liquid due to the formation of an air lock in the bottle.

The openings 127b in the diaphragm 125 may be of square or rectangular shape, or may be arranged in a grid; alternatively they may be any of the shapes discussed in relation to the embodiment of FIGS. 1 to 5 for the corresponding openings. The metering pourer of the embodiment of FIGS. 6 to 9 may be attached to a bottle by the same means as described for the embodiment of FIGS. 1 to 5.

The pourer is protected by a screw cap 137 which is attached initially to an annular portion 136 interposed between two sleeves 132, 133 and is locked with respect to these elements: the connection between the cap 137 and the annular portion 136 is made by frangible stems which are broken upon first opening the bottle by unscrewing the cap from the pourer.

What I claim is:

1. In a metering pourer for attachment to the neck of a bottle, of the type comprising:
    a substantially cylindrical hollow body engageable on the mouth of a bottle,
    a metering control chamber disposed coaxially within the said hollow body and forming therewith an annular pouring passage for the liquid,
    an air inlet tube having an air inlet end and an air outlet end, said air inlet end of said air inlet tube being disposed within said metering control chamber, said air outlet end of said tube communicating, when said hollow body is engaged on the neck of a bottle, with the interior of the bottle,
    means defining, with said air inlet tube, an annular passage permitting the entry of liquid from the bottle into said metering control chamber when the bottle is tilted for pouring, the flow of air into the bottle through said air inlet tube permitting liquid to flow out therefrom until the level of liquid in said metering control chamber rises to cover said air inlet end of said air inlet tube,
    the improvement wherein;
        there is a diaphragm separating said annular pouring passage between the inside of said hollow body and the outside of said metering control chamber from the interior of the bottle,
        a plurality of openings in said diaphragm permitting liquid to flow therethrough from the interior of said bottle to said annular pouring passage, the dimensions of said openings being such that when wetted by the liquid a film of said liquid forms across each opening due to the surface tension of said liquid, thereby preventing air from traversing said diaphragm whilst the bottle is tilted.

2. The metering pourer of claim 1 wherein said openings in said diaphragm are in the form of arcuate slots concentric with the axis of said pourer body.

3. The metering pourer of claim 2 wherein said arcuate slot openings in said diaphragm have a radial width of between 0.45 mm and 0.55 mm.

4. The metering pourer of claim 1 wherein said openings in said diaphragm are in the form of circular holes disposed in at least one circle concentric with the axis of said pourer body.

5. The metering pourer of claim 4 wherein said holes have a diameter of about 0.5 mm.

6. The metering pourer of claim 1 wherein at least a part of said air inlet tube is provided with internal longitudinal radially inwardly projecting ribs for inhibiting the formation of transverse films of liquid which would impede the regular inflow of air along said air inlet tube during pouring.

7. The metering pourer of claim 1 wherein the pourer comprises:
   a first element forming said cylindrical hollow body and part of said metering control chamber,
   a second element having a flange for partly covering said metering control chamber and incorporating said air inlet tube,
   a third element incorporating a sleeve which surrounds a part of said air inlet tube of said second element to delimit an annular passage through which liquid can flow to said metering control chamber during pouring, and
   a fourth element incorporating said diaphragm and having a tubular part which communicates with said air inlet tube of said second element.

8. The metering pourer of claim 7, wherein said second element is interchangeable with other such second elements in which the outer diameter of said air inlet tube is different whereby to adjust the rate at which said metering control chamber is filled upon pouring thereby adjusting the quantity of liquid metered upon pouring.

9. The metering pourer of claim 1, wherein said metering control chamber has at the base thereof a wide mouth through which said air inlet tube extends into said chamber,
   a short collar surrounding said air inlet tube and defining together therewith an annular passage along which liquid from the bottle can flow upon tilting, the end of the said collar being spaced from said mouth of said metering control chamber and said inlet end of said air inlet tube being positioned in said metering control chamber in such a way that when the bottle is tilted beyond the horizontal by an angle less than a predetermined angle the liquid in said metering control chamber cannot rise to a level such as to cover said inlet end of said air inlet tube, thereby allowing continuous pouring of said liquid, but when said bottle is tilted beyond the horizontal by an angle greater than said predetermined angle, the liquid level in said metering control chamber rises to such a level as to close the end of the air inlet tube as liquid flows into said metering control chamber.

10. The metering pourer of claim 9, wherein said predetermined angle is in the region of 25°

11. The metering pourer of claim 9, comprising:
    a first element formed as an outer hollow body and an inner hollow body constituting part of the metering control chamber, said inner and outer hollow bodies defining between them said annular pouring passage,
    a second element comprising a transverse apertured diaphragm which separates said annular pouring passage from the interior of a bottle when the pourer is attached thereto, and
    a third element comprising an air inlet tube which projects into said metering control chamber, a collar surrounding said air inlet tube and defining, with said air inlet tube an annular passage through which liquid can flow into said metering control chamber when a bottle carrying the pourer is tilted for pouring, and a radial flange which moderates the speed of the outflowing liquid.

* * * * *